US009605713B2

(12) United States Patent
Fisher et al.

(10) Patent No.: US 9,605,713 B2
(45) Date of Patent: Mar. 28, 2017

(54) SLIDING BEARING WITH BEARING SUBSTRATE AND POLYMER IN-FILL

(71) Applicants: Mahle International GmbH, Stuttgart (DE); Mahle Engine Systems UK Ltd, Rugby (GB)

(72) Inventors: Nathan Fisher, Birmingham (GB); Natalie Phipps, Northampton (GB)

(73) Assignees: Mahle International GmbH (DE); Mahle Engine Systems UK Limited (GB)

(*) Notice: Subject to any disclaimer, the term of this patent is extended or adjusted under 35 U.S.C. 154(b) by 0 days.

(21) Appl. No.: 14/441,511

(22) PCT Filed: Nov. 7, 2013

(86) PCT No.: PCT/GB2013/052936
§ 371 (c)(1),
(2) Date: May 7, 2015

(87) PCT Pub. No.: WO2014/072729
PCT Pub. Date: May 15, 2014

(65) Prior Publication Data
US 2015/0308498 A1 Oct. 29, 2015

(30) Foreign Application Priority Data
Nov. 8, 2012 (GB) .................................. 1220163.8

(51) Int. Cl.
*F16C 17/02* (2006.01)
*F16C 33/20* (2006.01)
(Continued)

(52) U.S. Cl.
CPC ............ *F16C 33/20* (2013.01); *F16C 17/022* (2013.01); *F16C 17/24* (2013.01); *F16C 33/046* (2013.01);
(Continued)

(58) Field of Classification Search
CPC ............. F16C 17/022; F16C 9/00–9/06; F16C 33/046; F16C 33/20; F16C 33/203;
(Continued)

(56) References Cited

U.S. PATENT DOCUMENTS 2,914,367 A * 11/1959 Underwood .............. F16C 9/04
384/288
3,249,391 A * 5/1966 De Hart .................... F16C 9/04
384/294
(Continued)

FOREIGN PATENT DOCUMENTS

GB 2338995 A 1/2000
GB 2485806 A 5/2012
(Continued)

*Primary Examiner* — Alan B Waits
(74) *Attorney, Agent, or Firm* — Fishman Stewart PLLC

(57) ABSTRACT

A half bearing for a sliding bearing may include a bearing substrate having at least one relief region provided in a surface of the half bearing, and a substrate adjacent respective end faces of the bearing substrate. The half bearing may further include a polymer in-fill having a non-uniform thickness provided in a filled region, wherein the thickness of the polymer in-fill in the filled region may be greater proximate the respective end face than remote from the respective end face.

15 Claims, 10 Drawing Sheets

(51) Int. Cl.

| | |
|---|---|
| *F16C 33/10* | (2006.01) |
| *F16C 33/74* | (2006.01) |
| *F16C 17/24* | (2006.01) |
| *F16C 33/04* | (2006.01) |
| *F16C 33/24* | (2006.01) |
| *F16C 9/00* | (2006.01) |

(52) U.S. Cl.
CPC .......... *F16C 33/106* (2013.01); *F16C 33/203* (2013.01); *F16C 33/208* (2013.01); *F16C 33/24* (2013.01); *F16C 33/74* (2013.01); *F16C 9/00* (2013.01)

(58) Field of Classification Search
CPC ...... F16C 33/205; F16C 33/206; F16C 33/74; F16C 33/106; F16C 33/24
See application file for complete search history.

(56) References Cited

U.S. PATENT DOCUMENTS

| | | | | |
|---|---|---|---|---|
| 4,458,555 | A * | 7/1984 | Holtzberg | B32B 5/26 123/197.3 |
| 5,520,466 | A * | 5/1996 | Everitt | F16C 9/02 384/124 |
| 5,707,155 | A * | 1/1998 | Banfield | F16C 33/06 384/276 |
| 6,089,755 | A * | 7/2000 | Okamoto | F16C 9/02 384/276 |
| 6,149,310 | A * | 11/2000 | Ono | F02F 7/0053 384/294 |
| 6,273,612 | B1 * | 8/2001 | Ono | F16C 9/04 384/276 |
| 6,357,918 | B1 * | 3/2002 | Kagohara | C23C 22/08 384/276 |
| 6,497,513 | B2 * | 12/2002 | Yamada | F16C 33/12 384/283 |
| 6,543,334 | B2 * | 4/2003 | Yamauchi | F02F 1/108 384/294 |
| 6,648,513 | B2 * | 11/2003 | Okamoto | F16C 9/04 384/192 |
| 8,500,334 | B2 * | 8/2013 | Issler | F16C 9/02 384/288 |
| 8,636,415 | B2 * | 1/2014 | Kimura | F16C 17/022 384/130 |
| 2002/0085779 | A1 | 7/2002 | Niwa et al. | |
| 2003/0134141 | A1 * | 7/2003 | Okado | F16C 5/00 428/626 |
| 2005/0196084 | A1 | 9/2005 | Kitahara et al. | |
| 2012/0114971 | A1 * | 5/2012 | Andler | B22F 7/04 428/647 |
| 2012/0177309 | A1 * | 7/2012 | Flores | F16C 9/00 384/286 |
| 2012/0263403 | A1 * | 10/2012 | Kimura | F16C 17/022 384/130 |
| 2015/0036955 | A1 * | 2/2015 | Nomura | F04C 18/02 384/368 |
| 2015/0330445 | A1 * | 11/2015 | Kamiya | F16C 33/206 384/297 |
| 2016/0091022 | A1 * | 3/2016 | Kamiya | F16C 33/1095 384/297 |

FOREIGN PATENT DOCUMENTS

| | | |
|---|---|---|
| GB | 2485807 A | 5/2012 |
| WO | WO-2007016915 A2 | 2/2007 |

* cited by examiner

SLIDING BEARING WITH BEARING SUBSTRATE AND POLYMER IN-FILL

CROSS-REFERENCE TO RELATED APPLICATION

This application claims priority to International Patent Application No. PCT/GB2013/0529936, filed on Nov. 7, 2013, and GB Application No. 1220163.8, filed Nov. 8, 2012, which applications are hereby incorporated by reference in their entirety.

TECHNICAL FIELD

The present invention relates to sliding bearings, more particularly to bearings that enable an engine to operate with a lower volume flow rate of oil.

BACKGROUND

An internal combustion engine is typically provided with an oil pump which pumps lubrication oil under pressure into the bearing clearance between a pair of half bearings and a rotating shaft in the bearing assembly. The lubrication oil is pumped to the inner face of one or both half bearings (e.g. into a groove in the inner face of one or both half bearings). High oil pressure is required to hydrodynamically lubricate the bearing, i.e. maintain the oil film separating the half bearings and the rotating shaft. The inherent nature of bearings typically employed in engines is that they permit axial side oil leakage from within the bearing clearance. Accordingly, engines commonly require oil pumps to have a high flow rate in order to maintain the oil pressure within the bearing clearance.

The bearing assembly has a rotatable shaft held between two halves of a housing (e.g. an engine housing comprising an engine cap and an engine block, or a connecting rod housing). Commonly the housing is assembled with a pair of bearing shells respectively providing running surfaces that face the rotating shaft. Alternatively, the running surface may be provided on the housing (typically with additional coatings provided on the surface of the housing), without the use of bearing shells between the shaft and housing.

Oil leakage is particularly pronounced in regions adjacent the end faces of the half bearing, as commonly, the inner faces of half bearings are provided with relief regions extending from the end faces (joint faces). The relief regions comprise crush relief regions (bore relief regions) and/or eccentric relief regions. In use, the half bearing has a concave inner surface that is generally concentric with the axis of rotation of the shaft within the bearing assembly. The relief regions adjacent the end faces provide a locally increased bearing clearance, which increases towards the adjacent end face.

The crush relief regions are regions of the concave inner face of the bearing of the half bearing in which the bearing clearance is wider, that extends no more than 30° from the adjacent end face, and typically extends no more than 10°. They are used to avoid the danger of a small step in the assembled bore, at the joint between the pair of complementary half bearings. Such a step could otherwise arise due to any of: misalignment between parts of the housing; wall thickness variations between upper and lower bearing shells; or localised swelling or yielding of a bearing shell at the end face under compression (bearing shells are compressed circumferentially in the assembled bearing, to provide an interference fit with the housing). In the case of a generally semi-cylindrical bearing shell, the crush reliefs are typically regions of reduced wall thickness, on the concave inner surface of the half bearing, extending from the end faces of the half bearings.

The eccentric relief regions are longer regions that are machined (e.g. bored) to provide a greater bearing clearance than at the crown (mid-way circumferentially between the end faces). Commonly the eccentric relief regions extend to or close to the crown. For example the eccentric reliefs may be machined to be curved about a centre of curvature that is slightly removed from the corresponding half bearing, relative to the centre of rotation of the shaft, and which has a slightly larger radius of curvature than the separation between the axis of rotation and the internal face at the crown. Eccentricity controls movement of the shaft, in use, to reduce engine noise, whilst providing adequate oil flow to dissipate heat from the bearing. The eccentric relief regions extend no more than 90° from the adjacent end face.

Accordingly, each relief region provides a bearing clearance that is wider (measured along a radius from the axis of rotation of the shaft) than in the crown region. However, to allow for manufacturing tolerances of the housing, the relief regions are designed to provide a greater increase in bearing clearance than is desirable, leading to increased leakage of the lubricating oil from within the bearing clearance, consequently necessitating an oil pump capable of a higher flow rate. Such pumps have several disadvantages including: much energy being wasted by the pump being physically too large and consuming too much engine power to drive it; the oil pump being unnecessarily heavy; and, under some operating conditions (e.g. when starting a cold engine with highly viscous oil, or at high rotational speeds) the pump may provide too much oil pressure and the oil flow may be diverted straight back into the engine sump via an oil pressure relief overflow valve without ever passing through the bearings.

SUMMARY

A first aspect of the invention provides a half bearing for a sliding bearing, the half bearing comprising a bearing substrate having relief regions provided in a surface of the bearing substrate adjacent respective end faces of the bearing substrate, and a polymer in-fill of non-uniform thickness provided in a filled relief region, wherein the thickness of the polymer in-fill in the filled relief region is greater proximate the respective end face than remote from the respective end face.

A second aspect of the invention comprises an engine comprising a half bearing according to the first aspect.

A third aspect of the invention provides a method of manufacturing a sliding bearing which is a half bearing, the half bearing comprising a bearing substrate having relief regions provided in a surface of the bearing substrate adjacent respective end faces of the bearing substrate, and a polymer in-fill of non-uniform thickness is provided in a filled relief region, wherein the thickness of the polymer in-fill in the filled relief region is greater proximate the respective end face than remote from the respective end face, the method comprising forming the bearing substrate, and depositing polymer onto the bearing substrate in the filled relief region.

Advantageously, in use polymer in-fill in the filled relief region, or regions, would wear only where it was required by the movements of the shaft within the bearing, tailor-making the shape of the bearing, leading to reduced oil leakage in the relief regions, particularly towards the end faces (joint faces). Further, this may enable the use of an oil pump having a smaller maximum oil flow rate, thereby reducing parasitic losses.

The thickness of the polymer in-fill in each relief region may decrease monotonically away from the respective end face.

The thickness of the polymer in-fill in each relief region may decrease substantially continuously away from the respective end face.

The polymer in-fill in each relief region may have a stepped reduction in thickness away from the respective end face.

The half bearing may comprise a circumferential channel in the filled relief region, wherein the polymer in-fill may have a greater thickness in lateral portions of the filled relief region, adjacent axial sides of the half bearing than in an intermediate portion. Accordingly, a channel may be provided in the filled relief region, extending from the corresponding end face. Advantageously, such axial thickness profiling of the polymer in-fill may provide a preferential flow direction for oil within the bearing clearance above the filled relief region, and so enhance oil flow to or from the complementary half bearing in the bearing assembly, whilst reducing axial oil leakage, as has been described above.

The half bearing may comprise a plurality of circumferential channels in the filled relief region.

The portions of polymer in-fill defining at least one circumferential channel in the filled relief region that may be at least partially tapered in a circumferential direction, increasing in axial width towards a respective end face.

The half bearing may comprise polymer seals extending circumferentially along the surface of the bearing substrate adjacent axial sides of the half bearing.

The half bearing may comprise a filled relief region adjacent each end face of the bearing substrate. The half bearing may be substantially mirror symmetric along a plane mid-way between the end faces.

The substrate may comprise a backing layer and a bearing lining layer on the concave face of the backing layer. The substrate may optionally have one or both of: an overlay layer on the concave face of the bearing lining layer; and, one or more intermediate layers between the bearing overlay and the lining layer. Typically, whilst in use, the rotating shaft and half bearing are held apart by a high pressure cushion of lubricating oil, such that they do not contact (i.e. hydrodynamically lubricated).

The structure of an exemplary half bearing has a steel backing, a bearing lining layer of an aluminium-based or copper-based alloy (including a copper-tin bronze-based alloy), an optional interlayer, and deposited polymer in-fill. An additional polymer overlay layer or a metal-based overlay layer (e.g. deposited by electro-plating or sputtering) may be provided on the bearing lining layer or interlayer. In the case of a polymer overlay layer, it may be provided before or after the polymer in-fill in the filled relief region.

However, the concave face of the half bearing requires a running surface that has a suitable balance of hard and soft properties (providing enhanced seizure resistance and enhanced conformability, respectively). Accordingly, the bearing lining layer, or any overlay layer, provides the running surface of the half bearing. Typically, half bearings with aluminium based alloy bearing lining layers provide suitable running surfaces and are not provided with overlay layers. In contrast, typically copper-based alloys of half bearings with copper-based alloy bearing lining layers do not provide suitable properties for a running surface, and are provided with an overlay layer.

The half bearing may comprise a polymer overlay layer provided on the substrate and/or on the polymer in-fill.

The plastics polymer material may be selected from the group consisting of: polyimide/amide resin, acrylate resin, epoxy resin, fluoropolymer (e.g. PTFE) and formaldehyde. The polymer may comprise a composite of a plastics polymer matrix with particulate. The particulate may be hard particulate (e.g. ceramic powder, silica, and metal powder such as aluminium flakes) and/or soft particulate (e.g. $MoS_2$ and graphite, and fluoropolymer such as PTFE). The polymer may comprise a matrix of a polyimide/amide plastics polymer material and having distributed throughout the matrix: from 5 to less than 15% vol of a metal powder; from 1 to 15% vol of a fluoropolymer, the balance being the polyimide/amide resin apart from incidental impurities.

The half bearing may be a bearing shell or a housing.

The half bearing may be a bearing shell, and the bearing shell may have a substantially uniform cross-sectional thickness (e.g. in the case that the bearing substrate was formed from a strip of uniform thickness into which a relief region was machined, then the polymer in-fill may be profiled to substantially correspond to the profile of material that was machined away to form the relief region).

The filled relief region may comprise a crush relief region and/or an eccentric relief region.

The polymer may be deposited by a spraying or printing process.

The polymer may be deposited by a printing process in which polymer in-fill of non-uniform thickness is deposited by at least first and second deposition steps in which deposited polymer layers extend by different distances from an end face.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: increments of integer multiples of 100; suffix letters and typographical marks (e.g. primes). For example, in different figures, 100, 200, 200', 300, 400, 500, 500' and 600 have been used to indicate a half bearing.

Figure 1:
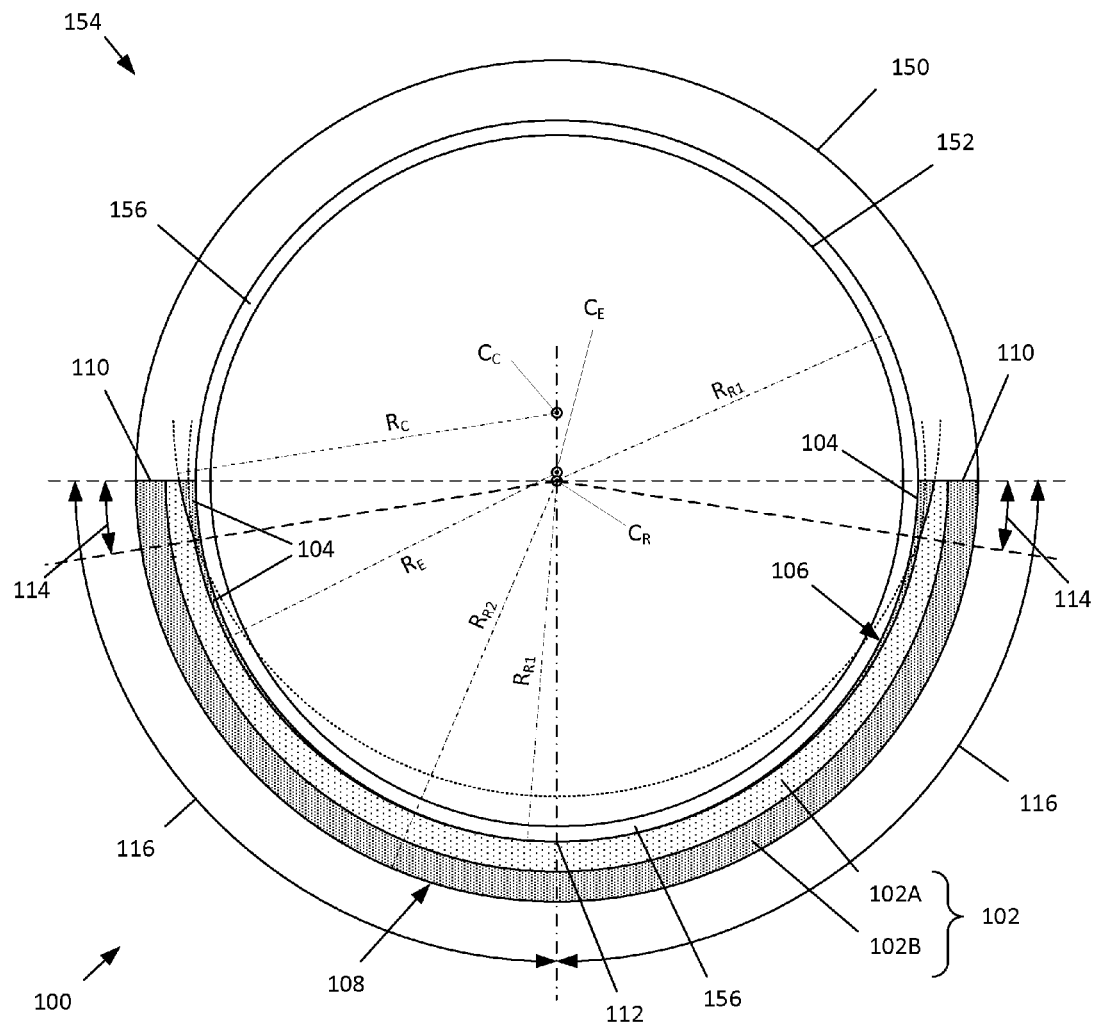
FIG. 1 shows an axial view of a half bearing having polymer in-fill in crush relief regions and eccentric relief regions.

FIG. 1 illustrates an embodiment of a half bearing 100 having a substantially semicylindrical bearing face (i.e. the concave, inner face). The half bearing 100 is shown in a bearing assembly 154 with a corresponding second mated half bearing 150 and a shaft 152 and an intervening bearing clearance 156.

The half bearing 100 is a bearing shell having a composite bearing substrate 102 and polymer regions 104, which provide polymer in-fill in filled relief regions 114 and 116 of the substrate. The substrate 102 comprises a bearing lining layer 102A on a robust backing layer 102B. The bearing lining layer 102A may be an aluminium- or copper-based alloy (including a bronze/copper-tin-based alloy). The backing layer 102B may be steel. An additional overlay layer (not shown in FIG. 1) may optionally be provided, e.g. to provide a running surface in the case that the bearing lining layer 102A is a copper-based alloy.

When mounted in a housing, the concave bearing surface 106 and the convex outer surface 108 of the half bearing 100 are substantially semi-cylindrical, being substantially concentric with the axis of rotation $C_R$ of the shaft 152, and each having a respective radius of curvature of $R_{R1}$ and $R_{R2}$. The half bearing 100 extends circumferentially between end faces (joint faces) 110, which mate with corresponding end faces of the second half bearing 150 in the assembled bearing 154.

The concave bearing surface 106 is provided by the concave cylindrical surfaces of the polymer regions 104. The polymer regions 104 substantially fill the crush relief regions 114 and the eccentric relief regions 116.

The half bearing 100 of FIG. 1 is shown with polymer in-fill 104 extending from each end face 110, in an arrangement that is mirror symmetric about a plane through the crown of the bearing 112. Alternatively, a polymer filled relief region may be provided extending from only one end face.

The bearing substrate 102 of the half bearing 100 is conveniently manufactured from a flat metal strip of uniform thickness, that is curved to provide a semi-cylindrical concave surface 106, substantially concentric with the axis of rotation $C_R$ of the shaft 152, once fitted into the housing (i.e. in use). It will be appreciated that such half bearings (bearing shells) 100 are typically manufactured with end faces 110 that are slightly more widely spaced apart in their free state than when mounted within the bearing assembly (which is known as "free spread"), such that they are held in the housing by friction during assembly (e.g. so that parts of the housing can be inverted, without the bearing shell falling out).

The relief regions 114 and 116 may conveniently be machined into the metal strip once it has been curved, approximately to the shape required for use. The eccentric relief region may be machined (e.g. by boring) with a slightly larger radius of curvature $R_E$, having a centre of curvature $C_E$ that is slightly further from the half bearing 100 than the axis of rotation of the shaft $C_R$. The crush relief regions 114 may be machined (e.g. by boring) or formed with a radius of curvature $R_c$ that is larger than the radius of curvature $R_E$ of the eccentric relief region, and having a centre of curvature $C_c$ that is further from the half bearing 100 than the centre of curvature $C_c$ of the eccentric relief regions 116. However, the bearing substrate may be machined by an alternative method, in which sequential boring steps are performed with differing levels of elastic deformation of the bearing shell (e.g. by pinching together the end faces 110). Or in a further alternative method, the bearing shell may be formed from a metal strip that is machined whilst flat, before being curved to shape.

In the half bearing 100 illustrated in FIG. 1, the eccentric relief regions 116 extend from the end faces 110 to the crown 112. However, it will be appreciated that alternatively, the eccentric reliefs could extend only part way from the end faces to the crown, with an intervening central region in which no relief is present.

Methods of polymer deposition onto the bearing substrate include (but are not limited to) spraying, screen printing or pad printing. In particular, screen printing or pad printing may be used to deposit patterned layers, e.g. one or more layers of uniform thickness.

The plastics polymer material may be selected from the group consisting of: polyimide/amide resin, acrylate resin, epoxy resin, fluoropolymer and formaldehyde. In the illustrated examples, the polymer is a composite polyimide/amide based polymer layer, such as a composite having a matrix of a polyimide/amide plastics polymer material and having distributed throughout the matrix: from 5 to less than 15% vol of a metal powder; from 1 to 15% vol of a fluoropolymer, the balance being the polyimide/amide resin apart from incidental impurities. In particular, the polymer composite may be 12.5% vol Al, 5.7% vol PTFE particulate, 4.8% vol silane, <0.1% vol other components, and balance (approximately 77% vol) polyimide/amide.

Advantageously, in-fill of the relief regions of a bearing substrate reduces the axial oil leakage from the half bearing in use. Further, the polymer in the relief regions may be worn by the rotating shaft in accordance with the requirements of each particular bearing (i.e. it is conformable). So, the polymer can be worn to the required shape for each individual bearing.

The half bearing may be an engine bearing, a crankshaft main bearing, a connecting rod bearing, balancer shaft bearing, or a cam shaft bearing.

The half bearing may have an oil supply hole and/or an oil groove, although none is shown in the illustrated half bearings.

Figure 2A:
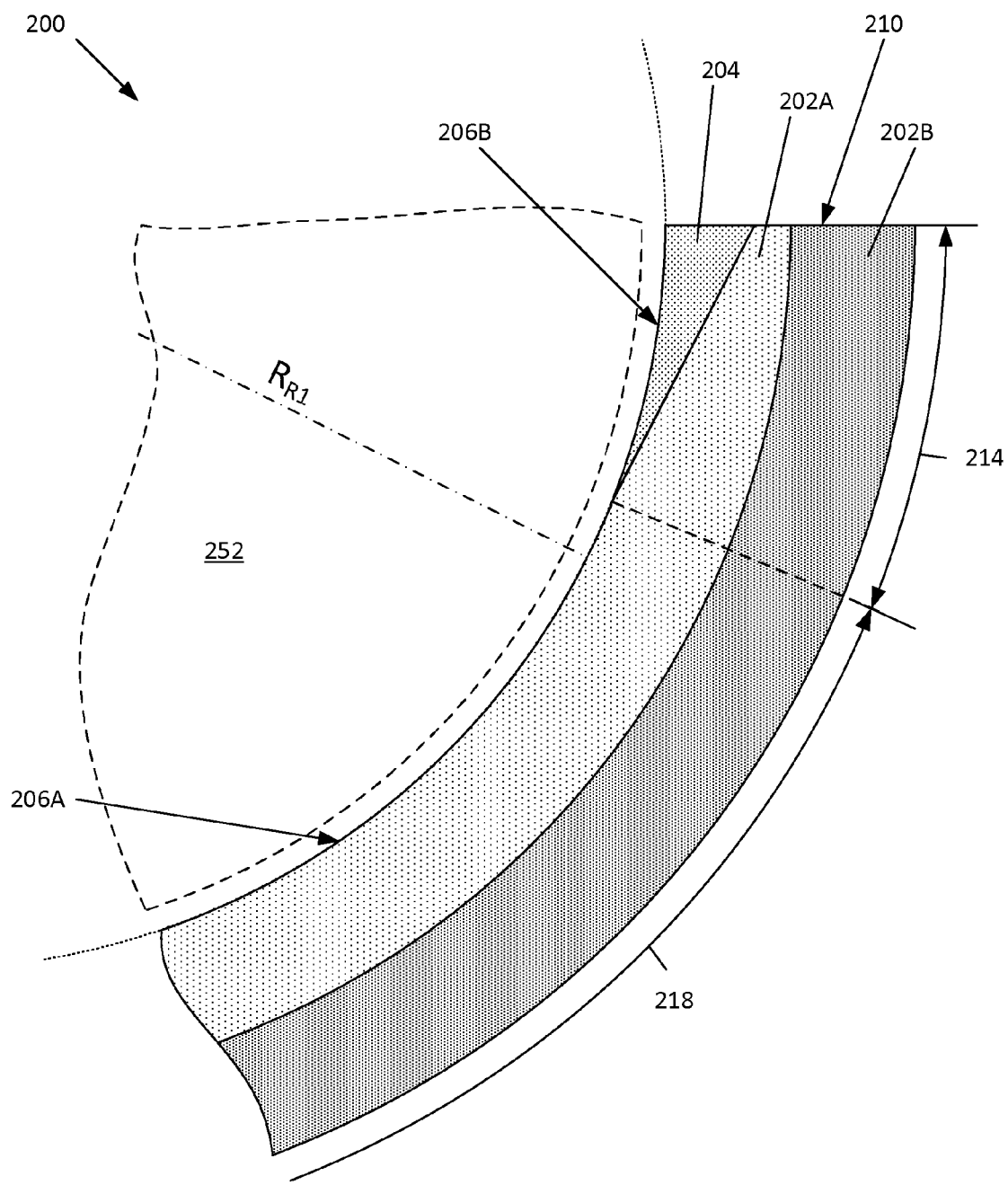
FIG. 2A shows an axial view of part of a half bearing having crush relief.
Figure 2B:
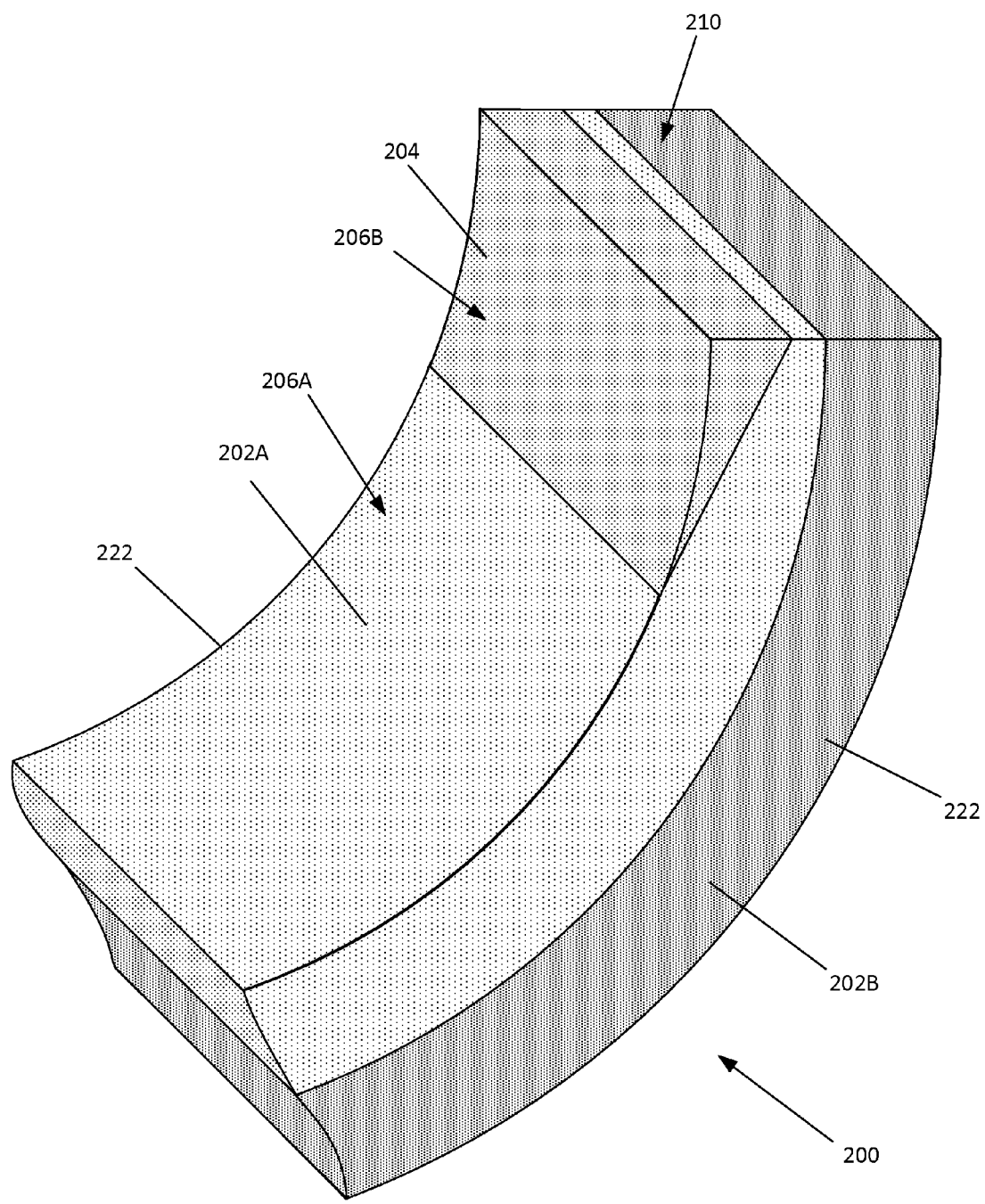
FIG. 2B shows a perspective view corresponding to FIG. 2A.

FIGS. 2A and 2B show part of a half bearing 200 (again a bearing shell) that only has crush relief regions 214, in which the corresponding part 206B of the concave face 206 of the half bearing is provided by the polymer in-fill in the filled crush relief region, and the other part 206A of the concave face is provided by the bearing lining layer 202A, in a central region 218.

By careful control of the polymer deposition, the polymer 204 in the crush relief region 214 may be deposited in a single deposition step with the thickness profile required, e.g. tapered from a maximum thickness of 1 to 50 μm (and preferably 12 to 40 μm) at the end face 210.

Figure 2C:
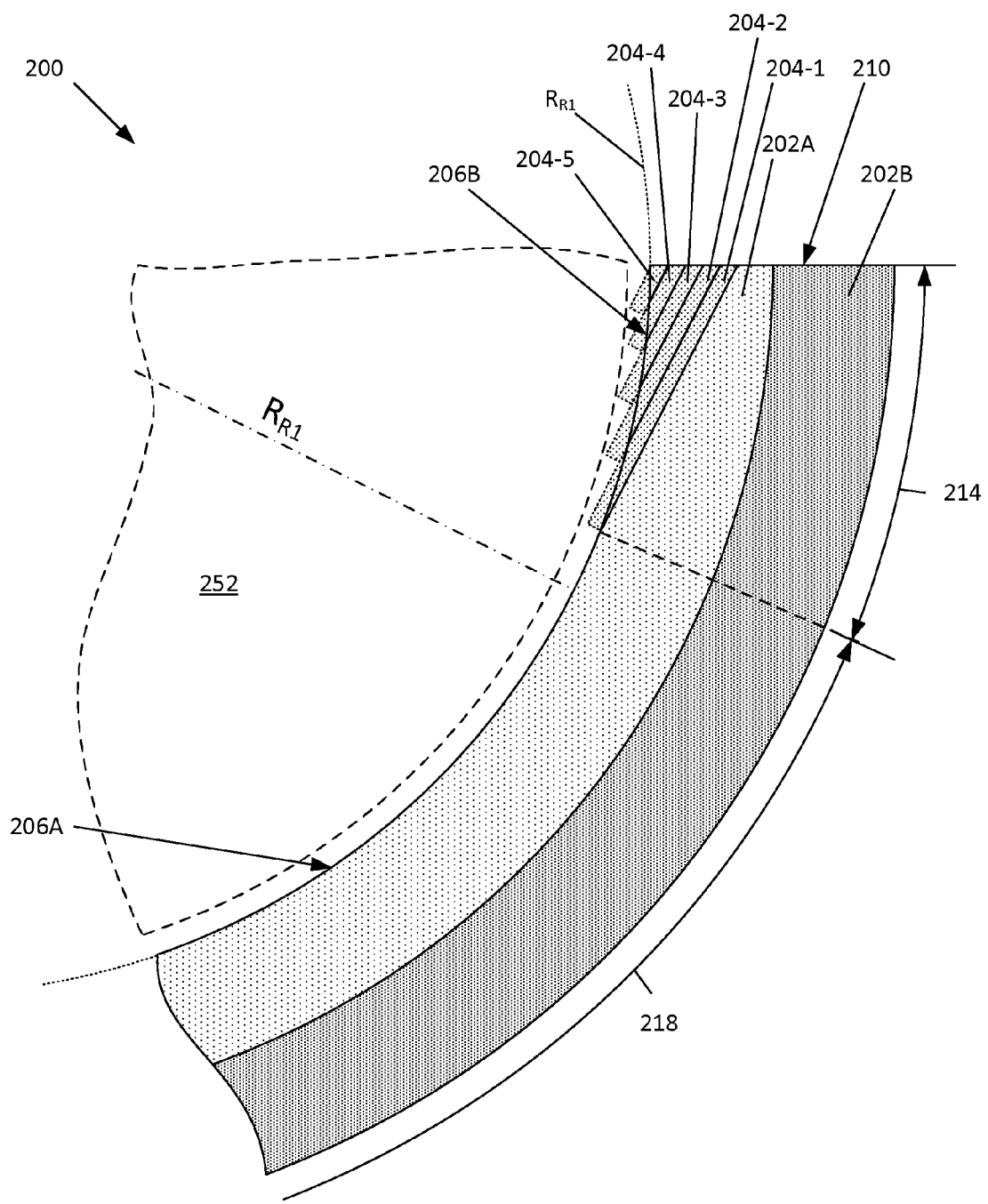
FIG. 2C shows an axial view corresponding to FIG. 2A, during an earlier part of a manufacturing process.

However, alternatively, the polymer may be deposited in layers, as shown in FIG. 2C, extending beyond the required thickness, e.g. by a multi-layer printing process, in which each successive layer 204-1 to 204-5 extends a shorter distance from the end face 210, giving the multi-layer assembly a greater thickness than is required, before being machined (e.g. bored) back to the radius of curvature $R_{R1}$ equal to the separation of the concave face at the crown 212 from the axis of rotation $C_R$ of the shaft. The thickness of the polymer in the relief regions may be between 1 and 50 μm (and preferably between 12 and 40 μm), and built up by deposition of successive layers, e.g. layers of 0.5 to 30 μm thickness. FIG. 2C illustrates only a small number of polymer layers 204-1 to 204-5, for clarity, but a larger number of thinner layers may be used.

Figure 2D:
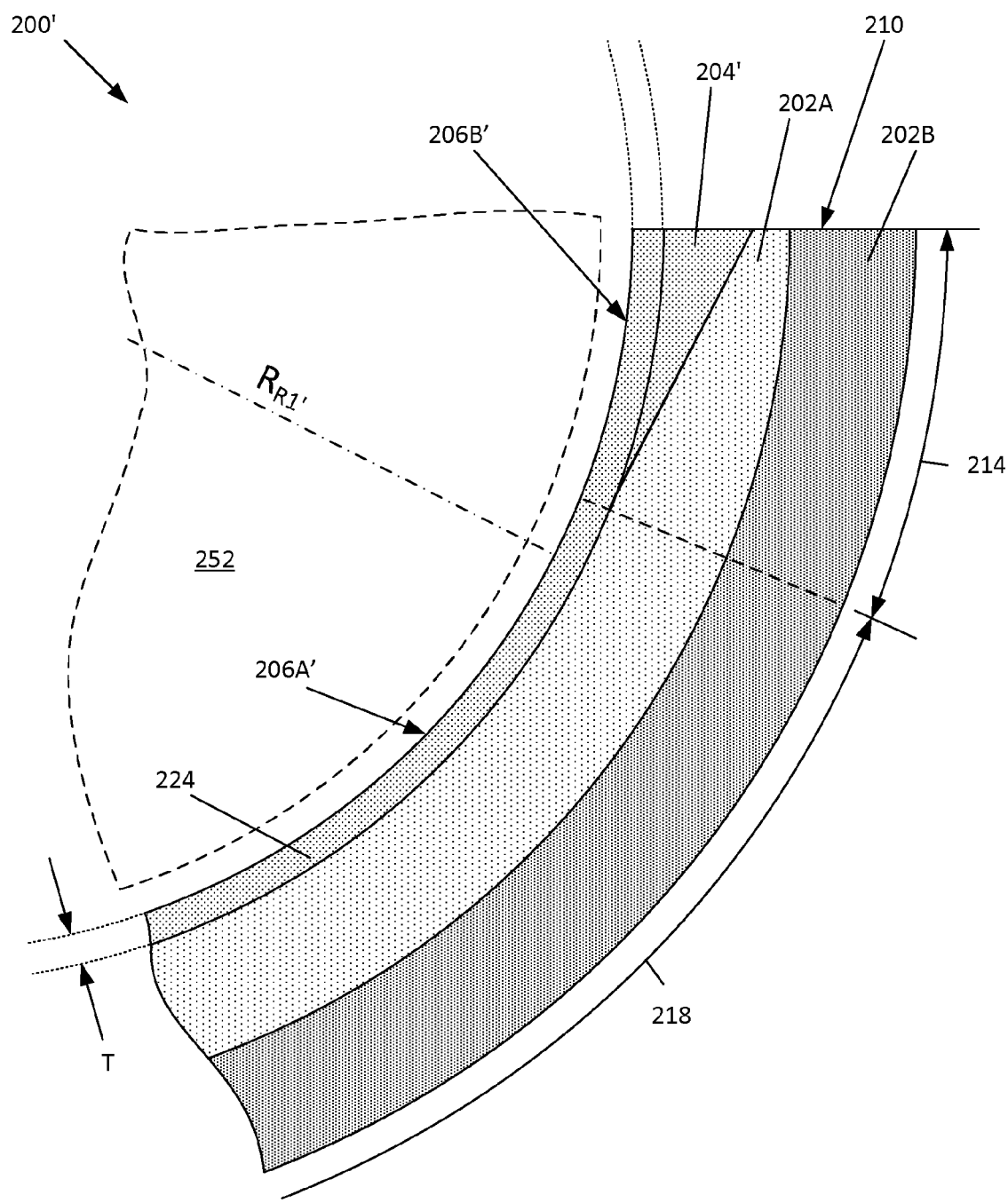
FIG. 2D shows an axial view of part of a half bearing having crush relief and a full polymer coating on the concave surface of the bearing substrate.

As shown by the half bearing 200' in FIG. 2D, the half bearings 100 and 200 of FIGS. 1 to 2C may additionally be provided with an overlay layer 224 of uniform thickness T which coats the entire inner surface of the bearing lining layer 202A. However, the overlay layer 224 may be provided before or after deposition of the polymer 204' in the filled relief regions 214.

Figure 3:
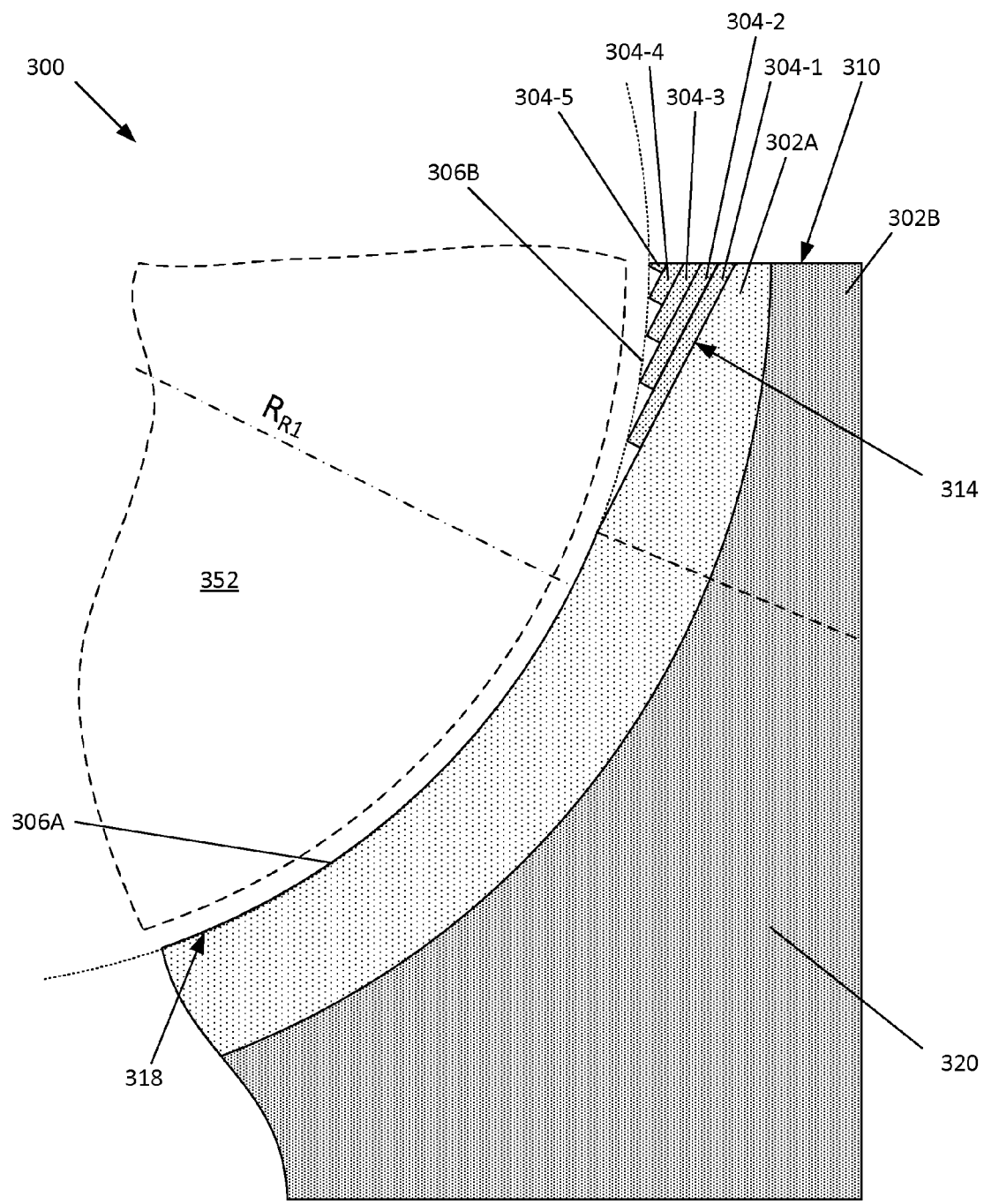
FIG. 3 shows an axial view of part of a half bearing having crush relief.

As is illustrated in FIG. 3, the present invention also applies to half bearings 300 in which the polymer in-fill 304 is directly deposited onto a housing (e.g. an engine housing) 320, rather than onto a bearing shell for mounting within a housing, as is shown in the earlier figures.

FIG. 3 also illustrates an alternative arrangement of the polymer, providing a stepped surface 306B in the crush relief region 314. The polymer layers 304-1 to 304-5 extend a slightly shorter distance from the end face 310 than in FIG. 2A, such that the maximal thickness of each layer, at the crown end (remote from the end face) substantially corresponds with the radius of curvature of the inner surface of central region 318.

Accordingly, the tapered thickness of the polymer in FIG. 2A may alternatively be conveniently approximated by a stepped thickness profile, which substantially fills the corresponding relief region, as illustrated in FIG. 3.

In FIGS. 1 to 3, the polymer in-fill in the filled relief regions reduces in thickness away from the corresponding end face (being either a continuous or a stepped reduction in thickness), but has a constant thickness axially (parallel to the axis of rotation of the shaft). Alternatively, the polymer in-fill may have a non-uniform thickness in the axial direction.

Figure 4:
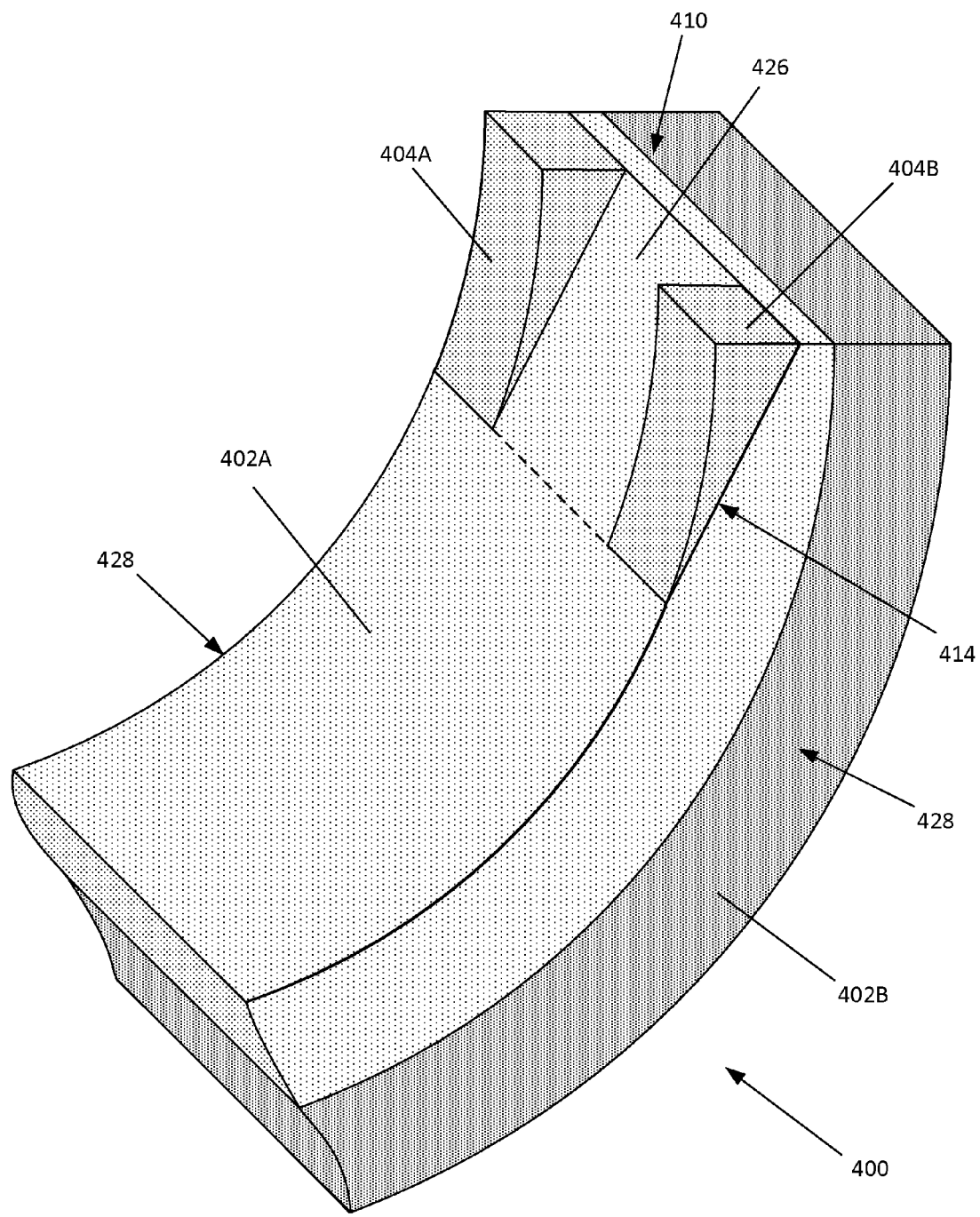
FIG. 4 shows a perspective view of a half bearing in which the polymer in-fill has a circumferential channel intermediate portions of the filled relief region adjacent the axial sides of the half bearing.

FIG. 4 illustrates a further embodiment in which a circumferential channel 426 is provided between lateral portions 404A and 404B of polymer in-fill adjacent the axial sides 428 of the half bearing 400. In use, oil is supplied under pressure into an oil clearance between the bearing surface 502A and a rotating crankshaft journal to produce an oil film in the oil clearance. The oil flows through the oil clearance, leaking out axially, and being circulated circumferentially through interaction with the rotating crankshaft journal. Advantageously, the circumferential channel 426 through the polymer in-fill in the crush relief regions 414 may provide enhanced circumferential oil flow between the half bearing 400 and the complementary half bearing in a bearing assembly, and reduced axial leakage in the crush relief regions.

Figure 5A:
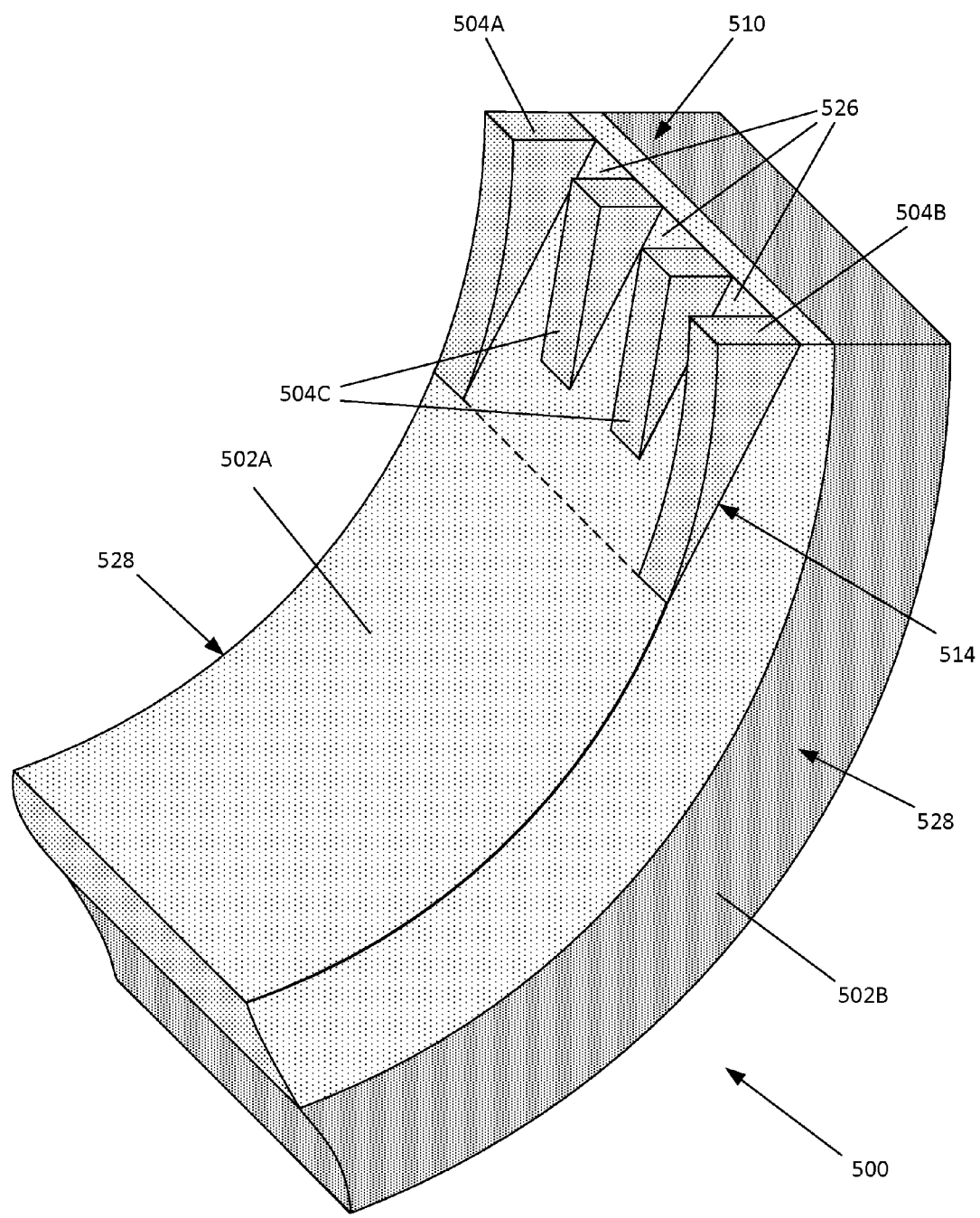
FIG. 5A shows a perspective view of a half bearing in which the polymer in-fill has a plurality of circumferential channels.

FIG. 5A illustrates an embodiment in which a plurality of circumferential channels 526 are provided between lateral portions 504A and 504B of polymer in-fill adjacent the axial sides 528 of the half bearing 500, the channels being spaced apart by intermediary portions 504C of polymer in-fill, in the form of circumferentially extending fins in the crush relief regions 514. Advantageously, the provision of a plurality of circumferential channels 526 may further reduce axial leakage in the crush relief regions 514. Further, the plurality of channels 526 may promote the discharge of particulate in the oil film within the oil clearance of the illustrated half bearing 500 to a complementary half bearing in a bearing assembly.

A pair of half bearings are typically arranged such that the highest loads that arise during the corresponding piston firing cycle are applied to one half bearing, and advantageously the illustrated half bearing 500 may be provided as the more highly loaded half bearing, and the other half bearing may be provided with a bearing surface that is particularly suited to embedding particulate (e.g. may be less hard wearing), with the plurality of channels 526 promoting the migration of particulate circumferentially around the oil clearance to the other half bearing for embedding.

Figure 5B:
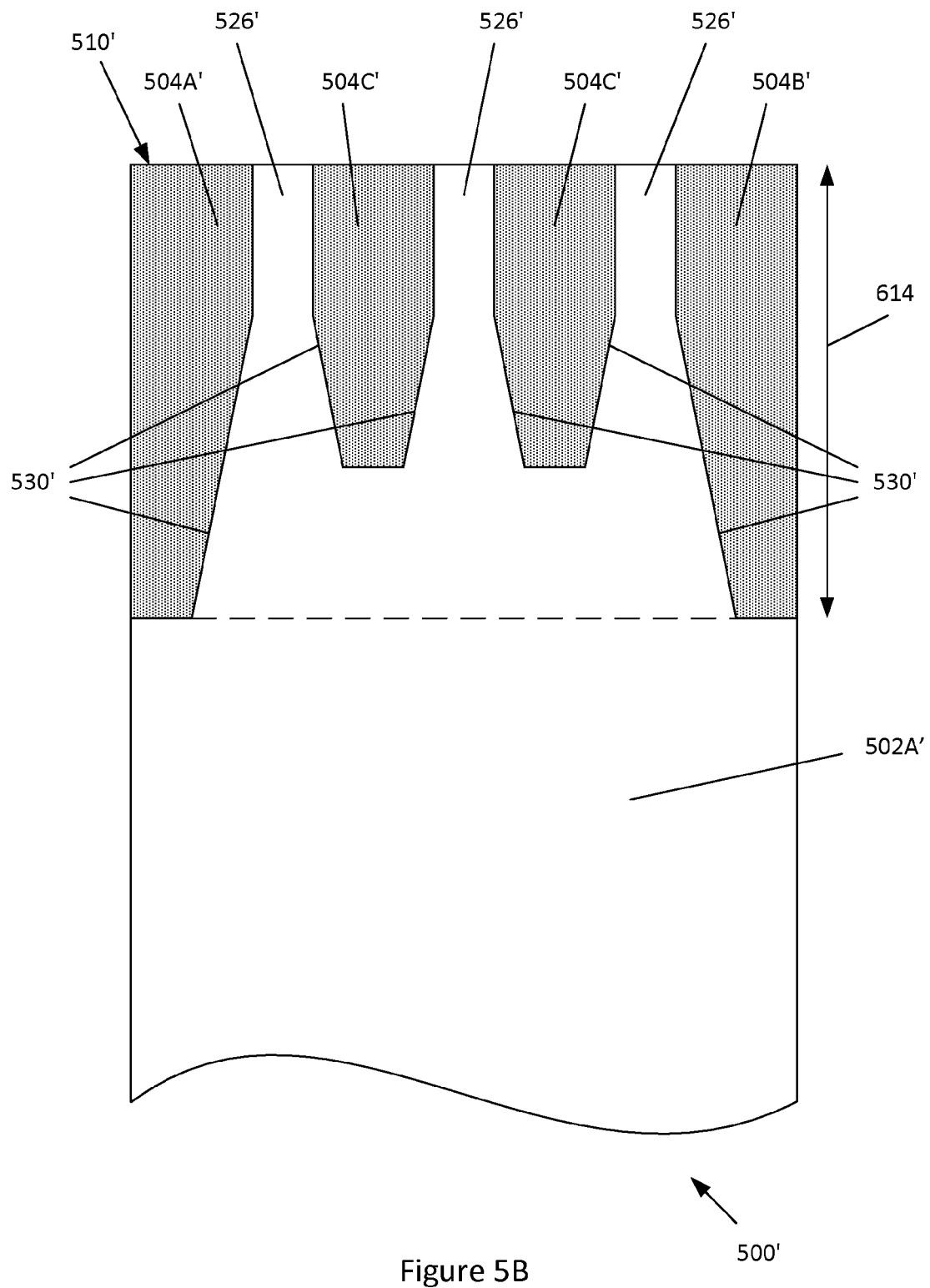
FIG. 5B shows a radial view of further half bearing in which the polymer in-fill has a plurality of circumferential channels.

The lateral and/or intermediary portions 504A', 504B' and 504C' of polymer in-fill may be at least partially tapered 530', increasing in axial width towards the respective end face 510', as illustrated in FIG. 5B. Advantageously, axial tapering 530' may reduce the resistance of the lateral and/or intermediary portions 504A', 504B' and 504C' of polymer in-fill to circumferential oil flow, and may allow for improved conformability of the bearing shell to a crankshaft journal in use.

Figure 6:
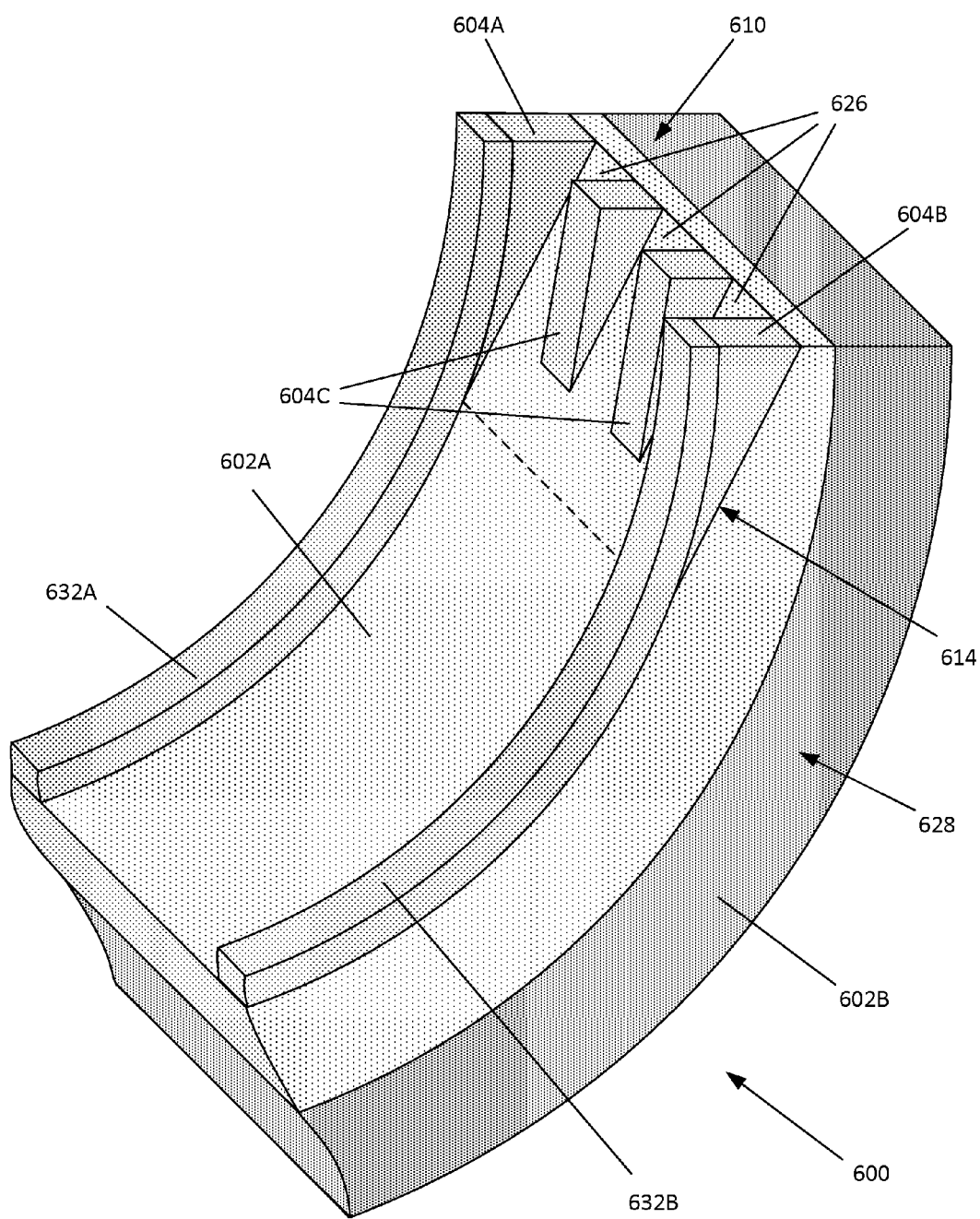
FIG. 6 shows a perspective view of a half bearing in which the polymer in-fill has a plurality of circumferential channels and circumferential seals are provided adjacent the axial sides of the half bearing.

Polymer seals 632A and 632B may additionally be provided along the circumference of the bearing surface of the half bearing 600, e.g. at the axial sides 628, as illustrated in FIG. 6. In operation, the polymer seals 632A and 632B co-operate with the running surface of a rotating crankshaft journal (not shown). In cooperation with the lateral portions 604A and 604B of polymer in-fill, the polymer seals 632A and 632B reduce the axial leakage of oil from within the oil clearance, maintaining a higher oil pressure within the oil clearance. Further, the polymer seals are relatively flexible, and in use provide improved sealing in the case of misalignment between the crankshaft journal and the bearing.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A half bearing for a sliding bearing, the half bearing comprising:
 a bearing substrate having at least one relief region provided in a surface of the half bearing;
 a substrate adjacent respective end faces of the bearing substrate;
 a polymer in-fill of non-uniform thickness provided in the at least one relief region to form a filled relief region, wherein the thickness of the polymer in-fill in the filled relief region is greater proximate the respective end face than remote from the respective end face; and
 at least one circumferential channel in the filled relief region, wherein the polymer in-fill has a greater thickness in lateral portions of the filled relief region adjacent axial sides of the half bearing than in an intermediate portion.

2. A half bearing according to claim 1, wherein the thickness of the polymer in-fill in the filled relief region decreases away from the respective end face.

3. A half bearing according to claim 2, wherein the thickness of the polymer in-fill in the filled relief region decreases substantially continuously away from the respective end face.

4. A half bearing according to claim 2, wherein the polymer in-fill in the filled relief region has a stepped reduction in thickness away from the respective end face.

5. A half bearing according to claim 2, comprising polymer seals extending circumferentially along the surface of the bearing substrate adjacent axial sides of the half bearing.

6. A half bearing according to claim 2, wherein the at least one relief region includes a relief region adjacent each end face of the bearing substrate.

7. A half bearing according to claim 1, comprising a plurality of circumferential channels in the filled relief region.

8. A half bearing according to claim 1, comprising polymer seals extending circumferentially along the surface of the bearing substrate adjacent axial sides of the half bearing.

9. A half bearing according to claim 1, comprising a filled relief region adjacent each end face of the bearing substrate.

10. A half bearing according to claim 1, wherein the polymer comprises at least one of polyimide/amide resin, acrylate resin, epoxy resin, fluoropolymer and formaldehyde.

11. A half bearing according to claim 1, comprising at least one of a bearing shell and a housing.

12. A half bearing according to claim 11, wherein the half bearing is a bearing shell, and the bearing shell has a substantially uniform cross-sectional thickness.

13. A half bearing according to claim 1, wherein the filled relief region comprises at least one of a crush relief region and an eccentric relief region.

14. An engine comprising a half bearing including:
 a bearing substrate having at least one relief region provided in a surface of the half bearing;
 a substrate adjacent respective end faces of the bearing substrate;
 a polymer in-fill of non-uniform thickness provided in the at least one relief region to form a filled relief region, wherein the thickness of the polymer in-fill in the filled relief region is greater proximate the respective end face than remote from the respective end face; and
 at least one circumferential channel in the filled relief region, wherein the polymer in-fill has a greater thickness in lateral portions of the filled relief region adjacent axial sides of the half bearing than in an intermediate portion.

15. A method of manufacturing a sliding bearing which is a half bearing, the method comprising:
 forming a bearing substrate having at least one relief region provided in a surface of the half bearing, and
 depositing a polymer onto the bearing substrate in the at least one relief region to form a filled relief region such that a thickness of the polymer in the filled region is greater proximate a respective end face of a bearing substrate of the half bearing than remote from the respective end face;
 wherein the polymer is deposited by one of a printing process or a spraying process in which polymer in-fill of non-uniform thickness is deposited by at least first and second deposition steps in which deposited polymer layers extend by different distances from an end face.

* * * * *